Aug. 11, 1936.   R. OHLSEN ET AL   2,050,456
SEALING MACHINE
Filed Jan. 26, 1933   8 Sheets-Sheet 1

Inventors:
Ray Ohlsen &
Anton J. Knuthowski
By John E. Gardner
Atty.

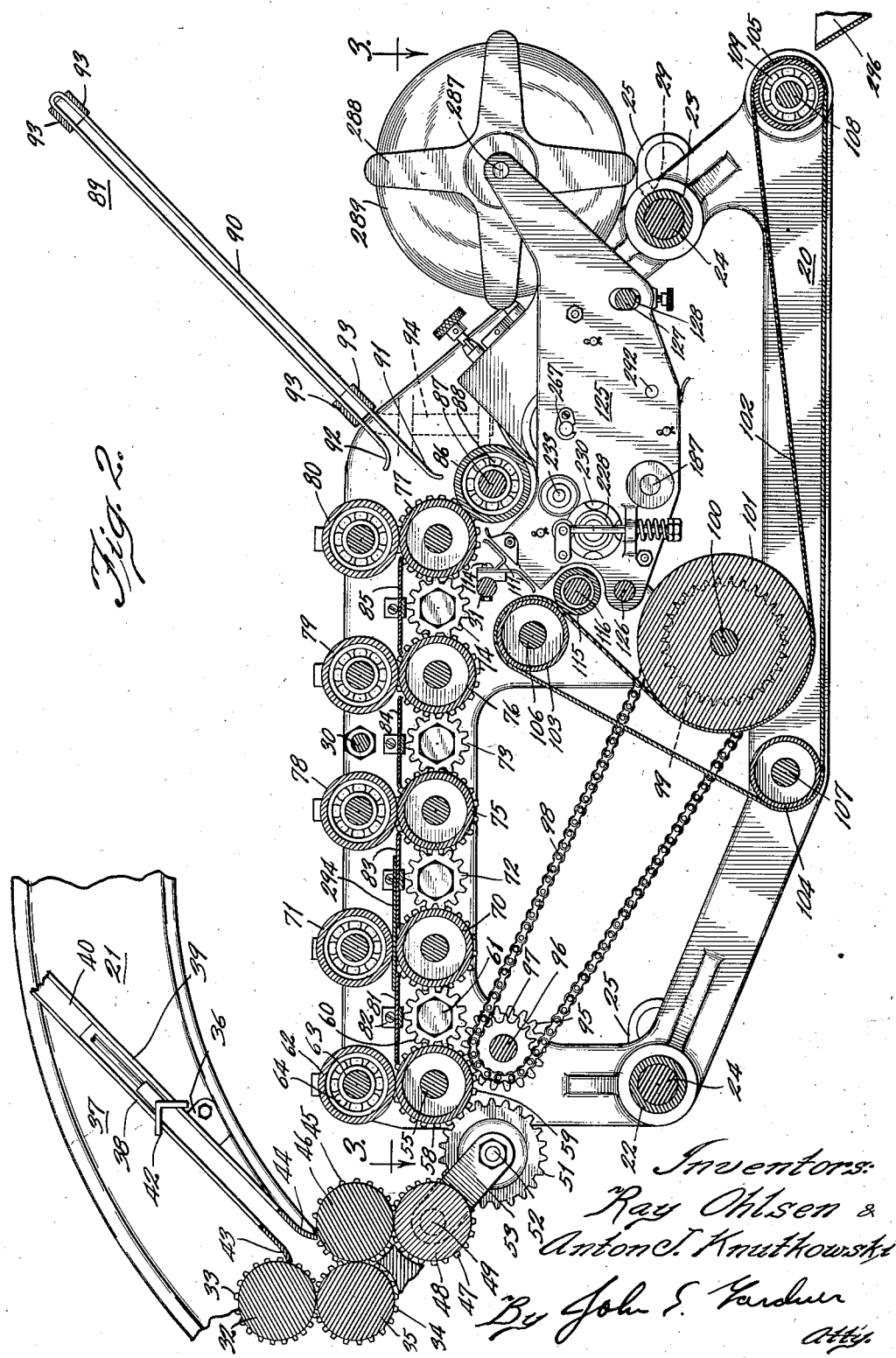

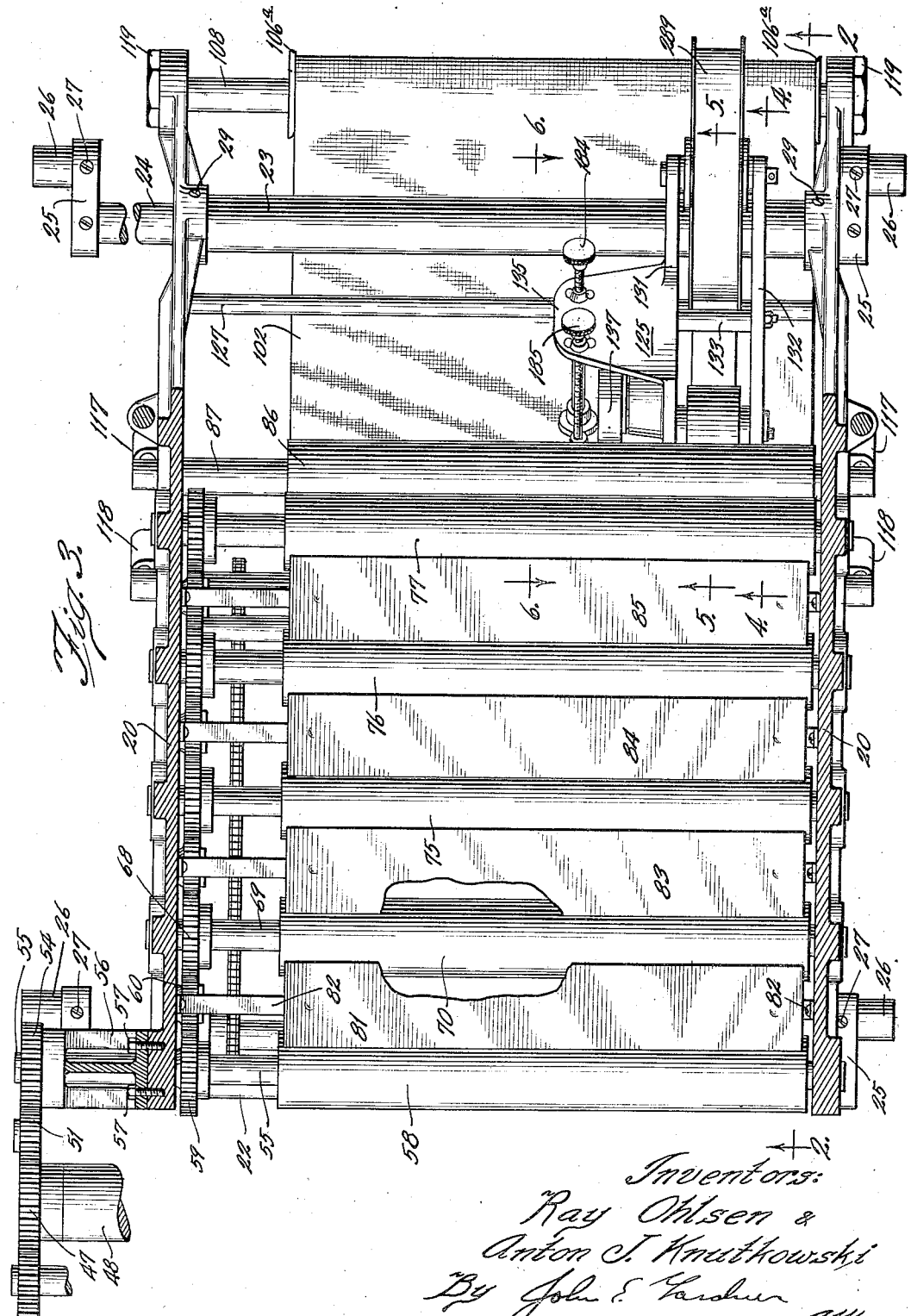

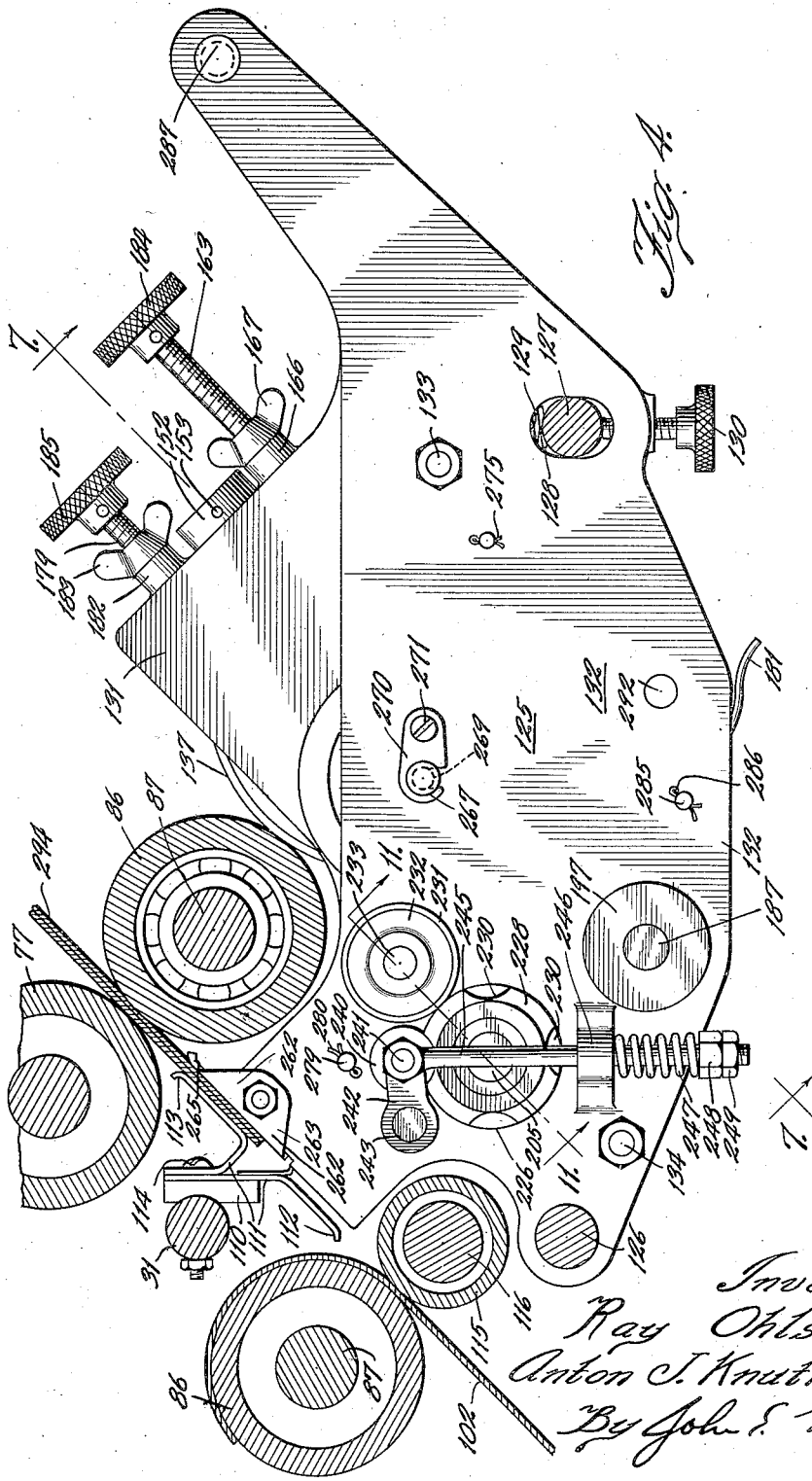

Aug. 11, 1936.                R. OHLSEN ET AL                    2,050,456
                              SEALING MACHINE
                          Filed Jan. 26, 1933              8 Sheets-Sheet 5
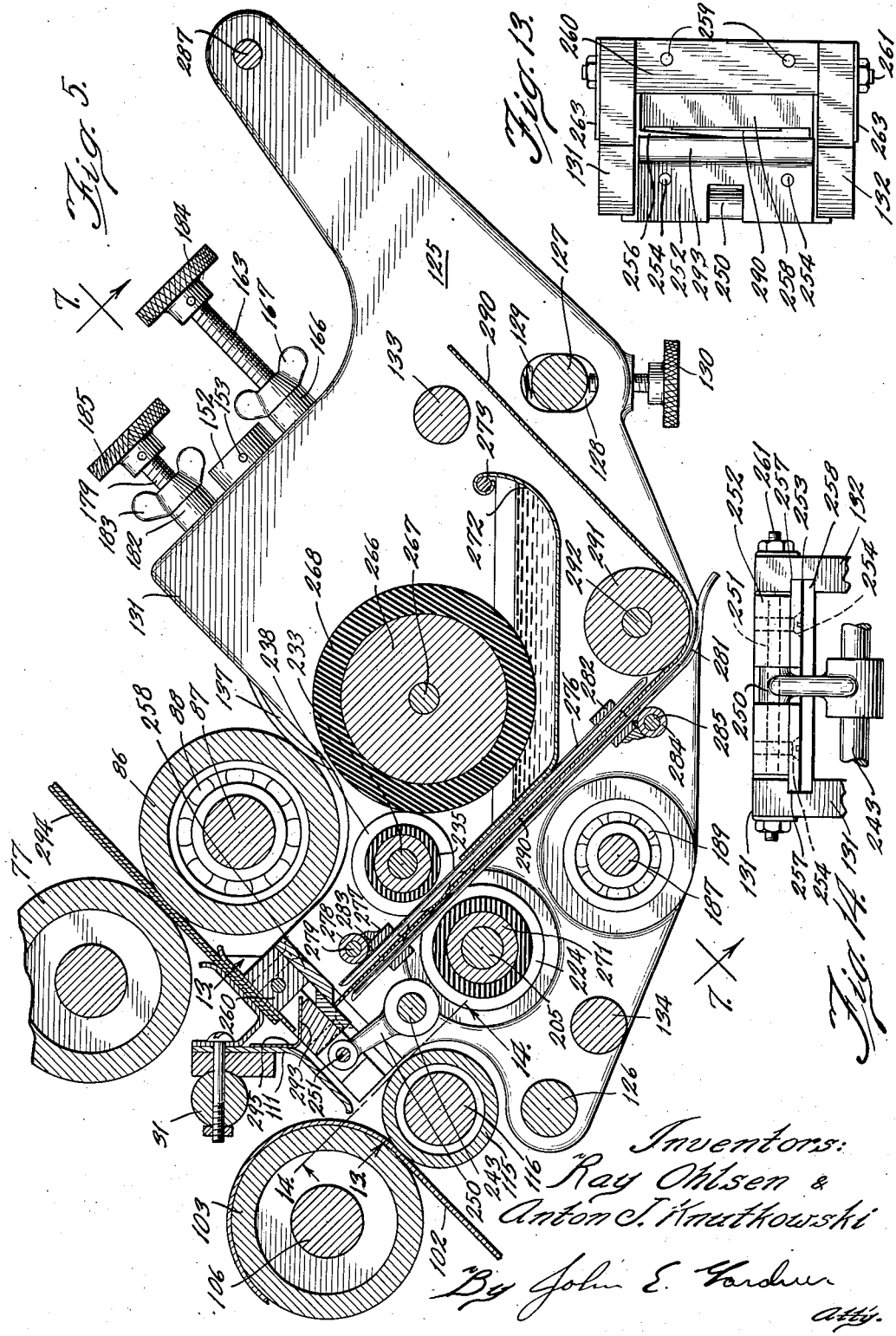

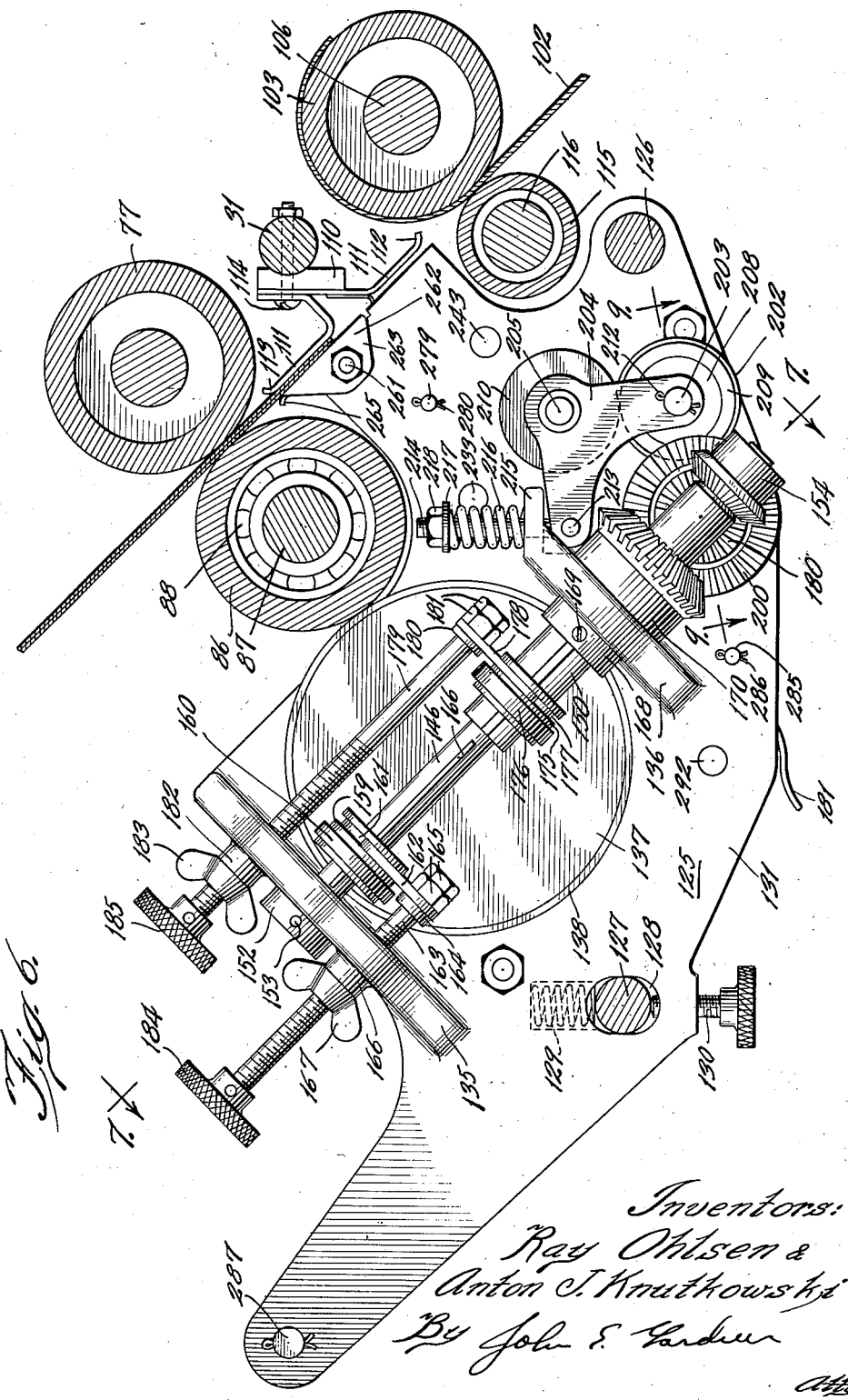

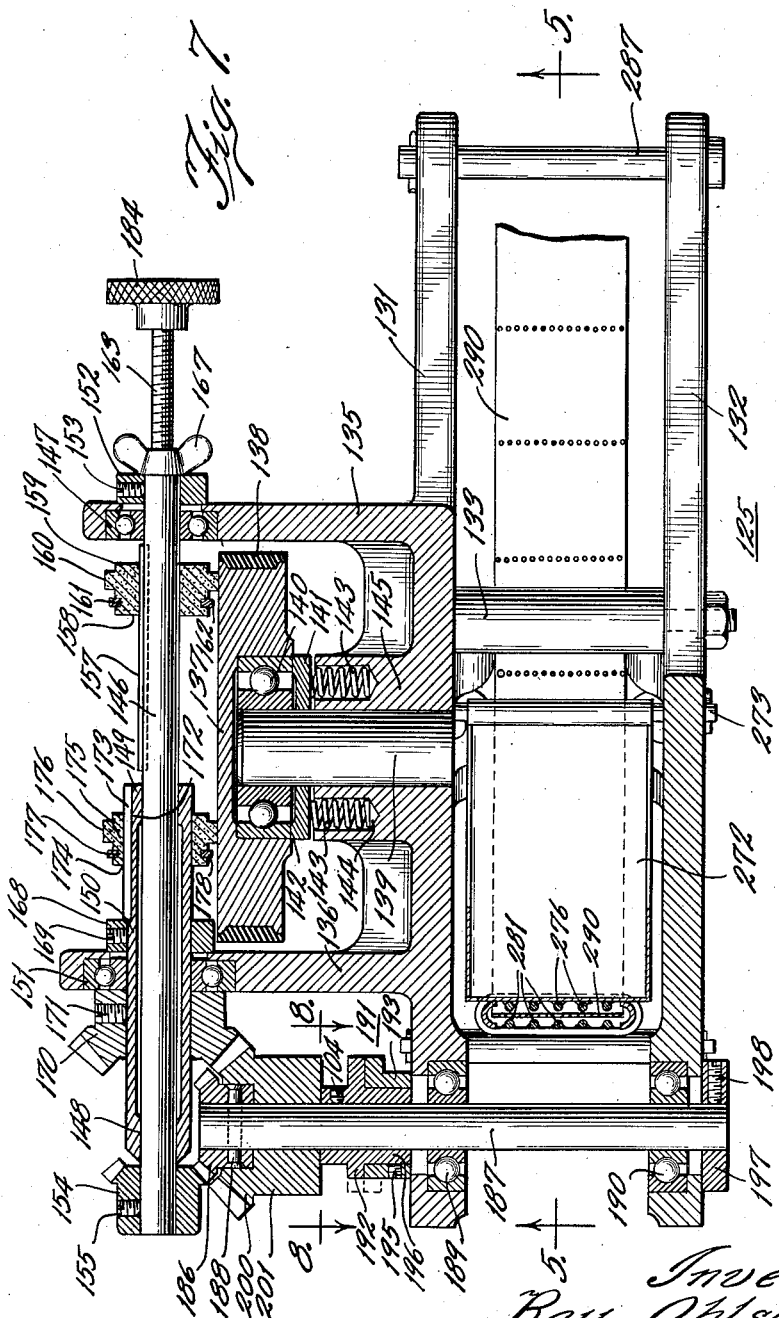

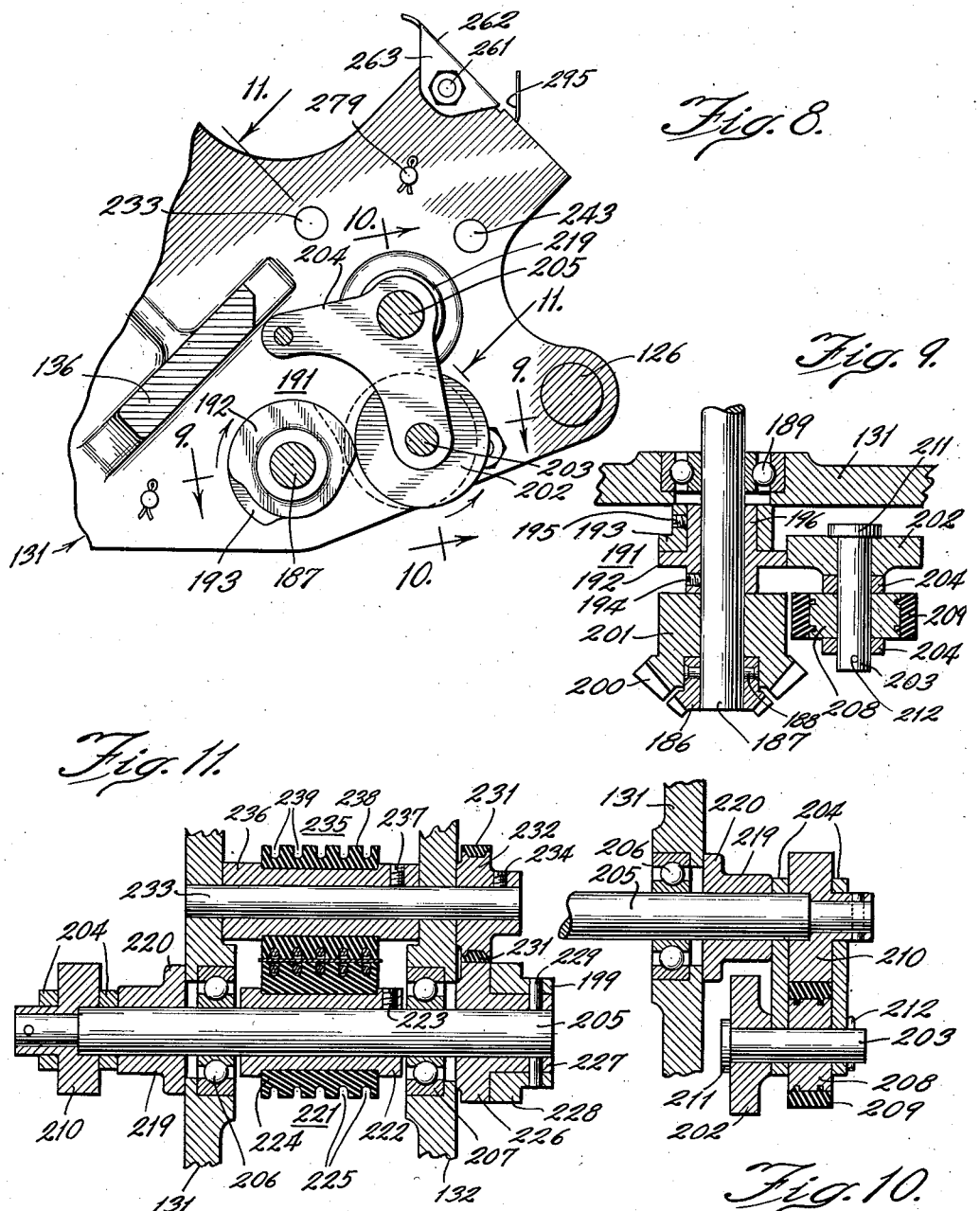

Patented Aug. 11, 1936

2,050,456

UNITED STATES PATENT OFFICE 2,050,456

SEALING MACHINE

Ray Ohlsen, Downers Grove, and Anton J. Knutkowski, Chicago, Ill., assignors to Dexter Folder Company, New York, N. Y., a corporation of New York (1934)

Application January 26, 1933, Serial No. 653,610

24 Claims. (Cl. 216—25)

The present invention relates in general to a sealing machine.

One of the objects of the present invention is to provide a novel machine which will apply a gummed seal to the open edges of a folder immediately after being folded.

Another object is to provide novel means responsive to the progress of the folder itself through the machine for initiating the operation of the sealing mechanism.

Another object is to cause the folder itself to drive the mechanism which applies the seal.

A further object is to provide an improved sealing device of this character that will accommodate various sizes of folders.

A further object is to provide sealing mechanism which will be operative to apply the seal at the proper time to the open edges of the folder irrespective of its size.

A further object is to provide mechanism for applying a seal to the open edges of a folder irrespective of the speed at which the folders may be fed into the machine or the space between successive folders.

Still another object is to provide means for adjusting the sealing machine to compensate for various sizes of folders.

Still another object is to provide sealing mechanism for employing pre-cancelled stamps as seals.

A still further object is to cut the pre-cancelled stamps at proper points form a roll of stamps and apply them to the open edges of a folder as seals.

A still further object is to provide means for compensating for the various thicknesses of folders.

A further object is to provide a sealing device of this character that may be attached to various types of folding machines in such a way that it will not interfere with the normal operation of such machine.

A further object is to accomplish the foregoing objects in a simple, rugged and effective manner with simple mechanism that can be inexpensively maintained.

There are other objects of our invention, which, together with the foregoing, will be described in the detailed specification that is to follow, taken in conjunction with the accompanying drawings, forming a part hereof.

In practicing our invention, we provide a supporting frame which is adapted to cooperate with the frame of folding machines and on which the parts of our sealing mechanism are mounted.

Our improved apparatus comprises, in accordance with one aspect of the invention, a plurality of feeding rollers, a reversing device for reversing the direction of travel of the folders, stamp feeding mechanism by which the stamps are fed into the path of travel of the folders and consisting of rollers for feeding the stamps from a roll thereof and watering the same, and means for cutting the stamps and applying them to the edges of successive folders that are fed through the apparatus and stacked.

Our improved apparatus, in accordance with another aspect of the invention, is associated with a folding machine of the buckle type and obtains its power therefrom whereby a large amount of mechanism is eliminated, the cost of the same greatly reduced, and the folding and sealing operations performed rapidly and efficiently.

The drawings illustrate a certain embodiment of our invention in association with the well known Cleveland type of folding machine.

It is to be expressly understood, however, that our invention may be readily embodied in or applied to other types of folding machines or may be embodied in mechanism constructed as a separate unit.

Referring now to the drawings, Fig. 1 is a top plan view of a portion of a "Cleveland" folding machine with our novel sealing machine or mechanism attached thereto.

Fig. 2 is an enlarged sectional elevation of our sealing apparatus or mechanism proper, taken along the line 2—2 of Fig. 1 looking in the direction of the arrows;

Fig. 3 is a cross section of the same taken along the line 3—3 of Fig. 2, looking in the direction of the arrows;

Fig. 4 is an enlarged sectional elevation of our improved sealing mechanism taken along the line 4—4 of Fig. 3 looking in the direction of the arrows;

Fig. 5 is a similar sectional elevation taken along the line 5—5 of Fig. 3 and Fig. 7, looking in the direction of the arrows;

Fig. 6 is a similar view taken along the line 6—6 of Fig. 3, looking in the direction of the arrows;

Fig. 7 is a section through the sealing mechanism illustrating the method of adjusting employed, taken along the line 7—7 of Figs. 4, 5 and 6, looking in the direction of the arrows;

Fig. 8 is a detailed or fragmentary elevation of a portion of our sealing mechanism taken along the line 8—8 of Fig. 7 looking in the direction of the arrows;

Fig. 9 is a detailed section of a portion of our sealing mechanism taken along the line 9—9 of Figs. 6 and 8;

Fig. 10 is a section of a portion of the sealing mechanism taken along the line 10—10 of Fig. 8, looking in the direction of the arrows;

Fig. 11 is another detailed section taken along the line 11—11 of Figs. 4 and 8 looking in the direction of the arrows;

Fig. 13 is a fragmentary plan of the cutting knife structure taken along the line 13—13 of Fig. 5;

Fig. 14 is a fragmentary elevation of the same taken along the line 14—14 of Fig. 5.

Like reference characters in the various figures of the drawings referred to in the following description will serve to identify like parts in each instance.

Figure 1:
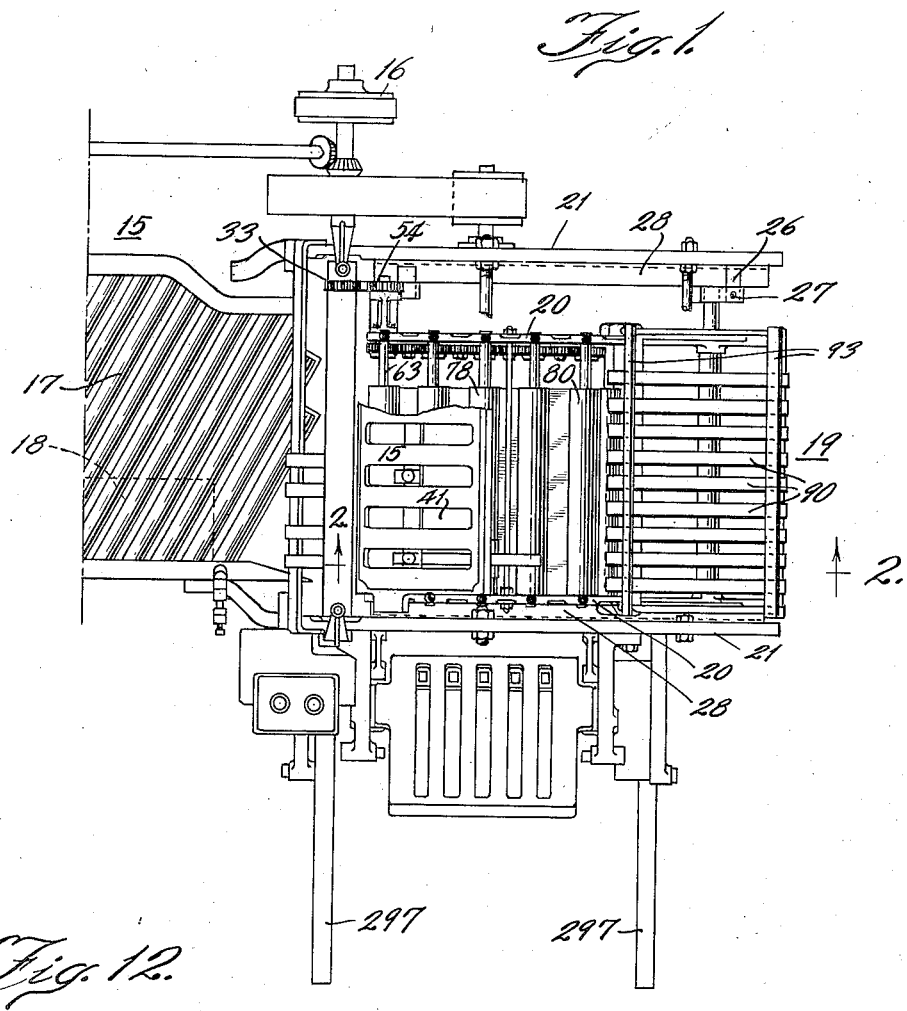

The reference character 15 designates generally a fragmentary portion of a well known "Cleveland" folding machine which is provided with the usual driving motor 16, feeding mechanism, not shown and diagonally mounted feeding rollers 17 for advancing sheets 18 to be folded in the direction of the folding mechanism. The folding machine is also provided with the usual automatic trip which is adapted to stop the machine when the automatic feeding device places or feeds two of the sheets to be folded on the rollers 17 at one time.

Our improved sealing mechanism or machine indicated generally by the reference character 19 comprises a metal frame, designated by the reference character 20 of a general rectangular shape.

The main frame 20 of the sealing mechanism is supported adjustably on the frame 21 of the folding machine by metal tubes 22 and 23. A solid shaft 24 telescopes each end of each of the metal tubes 22 and 23, fitting snugly therein and is provided with a crank arm 25 having a pin 26 secured in an opening therethrough by means of a set screw 27.

The pin 26 extends outwardly over the inwardly extending flanges 28 of the folding machine frame 21 and is semi-circular in shape, the flattened surface thereof resting on the inwardly extending flanges 28. The shafts 24 telescoping the tubes 23 are adjustably secured thereto by means of set screws 29. From this construction, it will be seen that the sealing device frame 20 can be adjusted so that it may be supported upon any sized folding machine frame. In other words, the two shafts 24 within each of the tubes 22 and 23 can be extended outwardly to accommodate the various widths of the folding machine frames and the set screws tightened after such adjustment is made to hold the sealing frame firmly in position, or the sealing machine frame may be adjusted transversely with respect to the folding machine frame in the same manner.

By rotating the shafts 24 in each of the tubes 22 and 23, as well as the pins 26, the height of the sealing device frame 20 may be adjusted within the radius of the crank arm 27. The main sealing device frame 20 is provided with cross members 30 and 31 which may be steel rods.

The folding machine 15 is provided with a feeding roller 32 toward one end thereof having a spur gear 33 attached to one of its ends and adapted to mesh with a spur gear 34 secured to another feeding roller 35 rotatable in bearings provided in the folding machine frame 21. A bracket 36 suitably secured to the frame 21 supports a folding element or panel 37 comprising a pair of plates 38 and 39 suitably spaced by a spacing member 40 and provided with slots 41 therein to reduce the friction of the paper 18 as it passes thereinto.

V-shaped stopping members 42 are adjustably secured to the top plate 38 in any suitable manner and serve to stop the upward travel of the paper when it is fed thereinto by the feeding rollers 32 and 35. The lower edges of the two plates 38 and 39 are flared outwardly as at 43 and 44 to guide the paper 18 in the direction of the stop 42. The gear 34 on the roller 35 also meshes with a spur gear 45 suitably secured to a feeding roller 46 which is rotatable on bearings in the frame 21. The spur gear 45 meshes with a spur gear 47 secured to a feeding roller 48 which is mounted upon a shaft 49 rotatable in bearings in the frame 21.

The spur gear 47 also meshes with a spur gear 51 suitably splined on a shaft 52 rotatable in bearings in link members 53 rotatable about the shaft 49 of and feeding roller 48 and secured in position thereon by any suitable means. This permits the gear 51 to be adjusted to mesh with a spur gear 54 suitably splined to a shaft 55 (Fig. 3) rotatable in ball or semi-friction bearings secured in the main sealing device frame 20 and bracket 56. The bracket 56 is supported by bolts 57 on the sealing device frame 20. The shaft 55 is provided with a feeding roller 58 which may be constructed of a metal tube with suitable spacers at the ends to permit its support upon the shaft 55.

Figure 12:
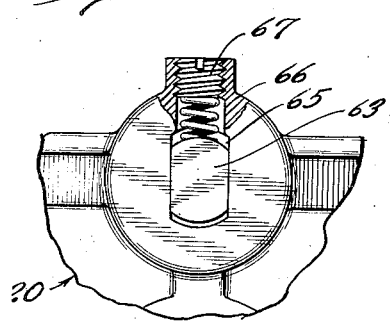
Fig. 12 is a fragmentary elevation, partly in section of the yielding feed roller mounting.

The shaft 55 is also provided with a spur gear 59 suitably secured thereto which is adapted to mesh with an idling spur gear 60 rotatably mounted upon a stub shaft 61 which is threaded into the main sealing device frame 20. A feeding roller 62, which may be a metal tube rotatable upon a yieldably mounted shaft 63 (Fig. 12) through the medium of semi-friction bearings 64 is positioned directly above the feeding roller 58. The feeding rollers 70 and 71 are exactly similar to the feeding rollers 58 and 62 previously described and are mounted in identically the same manner.

Idler gears 72, 73, and 74 mounted similar to gear 60 are disposed between and meshing with suitable gears of various feeding rollers 75, 76, and 77 which in the same manner as rollers 70, 71 have resiliently mounted cooperating rollers 78, 79, and 80, respectively. The spacing between these feeding rollers is such that a small card similar to a postal card will be positively fed through them.

A flat guiding plate 81 having upturned brackets 82 secured to each end for mounting on the main sealing frame 20 serves to guide the folders as they are being fed between the rollers 58, 62, 70, and 71. Similar plates 83, 84 and 85 are mounted between each pair of said feeding rollers previously described. (See Figs. 2 and 3.) A feeding roller 86 is mounted below but adjacent to the feeding roller 77 and rotatable on a shaft 87 by means of anti-friction bearings 88, in identically the same manner as the roller 62, previously described. The feeding roller 86 resiliently contacts the feeding roller 77 and is driven thereby in the same manner as the feeding rollers 62, 71, 78, 79, and 80 are driven by their associated feeding rollers.

The shaft 87 is resiliently mounted in brackets 117 formed integrally with the frame 20 and suitably secured thereto in a manner similar to the mounting of the shaft 63. (See Fig. 12.)

A reversing panel indicated generally by the reference character 89, consists of a number of metal strips 90 bent back upon themselves, flared outwardly at their ends 91 and 92, and suitably secured to cross members 93 by welding or otherwise, to form said panel. The reversing panel 89 is supported on the sealing frame 20 by means of brackets 94 in any suitable or desired manner. The spur gear 59 on the shaft 55 meshes with a spur gear 95 suitably splined to a shaft 96 rotatable in bearings in the sealing frame 20.

The shaft 96 has a sprocket 97 suitably secured thereto near its end driving a chain 98 which passes around a sprocket 99 fixed to a shaft 100 rotatable in bearings in the sealing frame 20. The shaft 100 is provided with a cylindrically shaped pulley 101 suitably secured thereto. A belt 102 passes around the driving pulley 101 and pulleys 103, 104, and 105 rotatably mounted upon shafts 106, 107, and 108 respectively in the sealing frame 20. While the pulleys referred to may be fixed upon the shafts and the shafts rotatable in bearings, in the frame, we prefer to make the pulley 105 rotatable on the shaft 108 by means of anti-friction bearings such as 109. The pulley 105 is provided with flanges 106a in either end for guiding the conveyor belt 102. The shaft 108 is mounted in the main sealing frame 20 by means of eccentric brackets 119 so that the position of the shaft may be changed to take up on the belt 102.

The cross member or rod 31 supports a bracket 110 to which spring shoe members 111 are suitably secured by screws 114. The spring shoe members 111 have upwardly flaring ends as at 112 and 113. A feeding roller 115 is rotatably mounted upon a shaft 116 which is yieldably supported upon brackets 118 on the main sealing frame 20 in a similar manner to the shaft 63 (see Fig. 12). The feeding roller 115 is in contact with the belt 102 and with the pulley 103 and is adapted to be driven by the belt in an obvious manner.

An auxiliary sealing frame designated generally by the reference character 125 is supported in the main sealing frame 20 upon cross rods 126 and 127 extending from side to side of the main sealing frame. The auxiliary frame 125 is pivoted on the rod 126 and a certain amount of adjustment permitted by the slotted openings 128 through which the rod 127 penetrates. The auxiliary frame 125 is supported upon compression springs 129 bearing against cross rod 127 and suitably held in position by a thumb screw 130.

The auxiliary frame 125 comprises side members 131 and 132 suitably spaced apart by spacers 133 and 134. The side member 131 is provided with outwardly extending portions or webs 135 and 136 which furnish mountings for the driving mechanism. A driving disc 137, driven by the feed roller 86 (Fig. 4) and having a rubber facing 138 about its periphery, is rotatable upon a stub shaft 139 suitably secured in the side member 131 of the auxiliary frame 125 by means of an anti-friction bearing 140. A collar 141 having an upstanding peripheral flange 142 bears against one surface of the driving disc 137 and is resiliently forced thereagainst by four compression springs 143 secured in seats 144 provided in a boss 145 formed integrally with the side member 131. Since the driving disc 137 is mounted in the auxiliary frame, the adjustment of the screw 130 will vary the spacing between the driving disc 137 and the feeding roller 86, the auxiliary frame 125 being adjusted about the pivot 126 in an obvious manner.

A shaft 146 is rotatably mounted within the webs 135 and 136 by means of anti-friction bearings 147 in the web 135 and by bearings provided at 148 and 149 in a sleeve 150 which it telescopes. The sleeve 150 is rotatable in the anti-friction bearing 151 secured in the web 136. One end of the shaft is provided with a collar 152 secured thereto by means of a set screw 153 while the other end of the shaft carries a miter gear 154 suitably secured thereto by means of a set screw 155. The shaft 146 is provided with a feather keyway as at 156, having a key 157 fitted therein cooperating with a groove 158 or keyway in a bearing wheel 159 which may be constructed of fiber or other suitable material. This bearing wheel is provided with a peripheral flanged portion 160 which contacts the surface of the driving disc 137 and a peripheral groove 161 into which a bifurcated operating member 162 is fitted. (See Figs. 6 and 7). The operating member 162 is suitably secured to an adjusting screw 163 between a collar 164 thereon and nuts 165. The adjusting screw 163 is threaded through a boss 166 formed integrally with the web 135.

A locking thumb nut 167 is adapted to lock the adjusting screw 163 against turning movement after the proper adjustment has been made. The sleeve 150 is secured in position in the bearing 151 by a collar 168 secured in place by means of a set screw 169 and a miter gear 170 suitably affixed to the sleeve by means of a set screw 171. The sleeve 150 is also provided with a feather keyway 172 having a key 173 therein cooperating with a groove 174 in a bearing wheel 175 constructed of fiber or other suitable material. The bearing wheel 175 is provided with a peripheral flange 176 attached to bear against the surface of the driving disc 137. The bearing wheel 175 is also provided with a peripheral groove 177 cooperating with a bifurcated operating member 178. The operating member 178 is fixed to the end of an adjusting screw 179 between a collar 180 formed integrally therewith and nuts 181.

The adjusting screw 179 is threaded through an opening in a boss 182 formed integrally with the web 135. A locking thumb nut 183 cooperates with the boss 182 to hold the adjusting screw 179 against movement after adjustment has been made. The adjusting screws 163 and 179 are provided with knurled heads 184 and 185, respectively, suitably secured thereto to provide easy turning movement thereof. The threads on the adjusting screws 163 and 179, respectively, are quite fine to permit close adjustment of the bearing wheels 159 and 175, respectively, with respect to the surface of the driving disc 137. The miter gear 154 meshes with a miter gear 186 fixed to a shaft 187 by a pin 188. The shaft 187 is rotatable in bearings 189 and 190 in the side members 131 and 132, respectively, of the auxiliary frame. The bearings 189 and 190 are anti-friction bearings. The opposite end of the shaft 187 is provided with a collar 197 suitably secured thereto by means of a set screw 198 to hold the shaft in position. The shaft 187 carries a cam member 191 secured thereto comprising two portions 192 and 193. The portion 192 is keyed to the shaft 187 by a set screw 194 while the other portion 193 is adjustably secured by eans of a set screw 195 on a hub 196 of the portion 192.

The shape of these cam surfaces can be observed more readily in Fig. 8. The cam 191 is operative to bring about the control of the feeding of the sealing tape. It is to be noted that by reason of the shaping of the two portions 192 and 193 and their adjustability with respect to each one as well as the shaft 187 that the cam surface may be varied to a considerable extent. The miter gear 170 meshes with a miter gear 200 provided with a hub 201 and is rotatable about the shaft 187. The hub 201 actuates the drive of the sealing tape feed.

The cam 191 is adapted to engage a bearing wheel 202 rotatable upon a stub shaft 203 carried in a pair of bell cranks 204 pivoted on a shaft 205 rotatable in bearings 206 and 207 in the side members 131 and 132, respectively, to the auxiliary frame 125. A driving wheel 208 is also rotatably mounted upon the stub shaft 203 and is provided with a rubber or suitable friction surface 209. The friction surface 209 is adapted to engage the hub 201 of the miter gear 200 at suitable times as controlled by the cam 191. The friction surface 209 of the driving wheel 208 engages a cooperating driving wheel 210 securely fixed to the shaft 205. The driving wheels 208 and 210, respectively, serve to space the two bell crank members 204. The contact wheel 202 and driving wheel 208 are suitably held on the stub shaft 203 by means of a head 211 and cotter pin 212. The other ends of the bell cranks 204 are connected together by a pin 213 to which is attached an I-bolt 214 that penetrates an opening in an extension 215 of the web 136.

The extension 215 forms a seat for a compression spring 216 telescoping the I-bolt 214 and bearing against a collar 217 secured in place by a nut 218 threaded onto the bolt 214. A collar 219 serves to space the bell cranks 204 from the side member 131 and is provided with a peripheral flange 220 to bear against the side member 131. The collar 219 is supported by the shaft 205 in an obvious manner. A feeding roller 221 which is provided with a metal hub 222 is suitably secured to the shaft 205 by means of a set screw 223 and is provided with a surface 224 of rubber or other suitable material having a plurality of peripheral grooves 225. The shaft 205 carries a driving wheel 226 having an extended hub 227, a cam member 228 fits over the hub 227, and the assembly is keyed to the shaft 205 by a pin 229 penetrating a hub 199 of cam 228 and the hub 227 of the driving wheel 226. The cam 228 is provided with a number of recesses 230 about its periphery. The space between the center points of these recesses determines the length of the seal cut from the sealing tape. For pre-cancelled stamps, it will be exactly seven eighths (⅞) of an inch. The driving wheel 226 engages the friction surface 231 of rubber or other suitable material secured to a driving wheel 232 attached to a shaft 233 by means of a set screw 234. The shaft 233 is rotatable in bearings in the side members 131 and 132 respectively of the auxiliary frame 125.

The shaft 233 carries a watering wheel 235 having a metal hub 236 secured thereto by a set screw 237 and a watering surface 238 constructed of rubber, felt or other suitable material and provided with a plurality of peripheral grooves 239 cooperating with the grooves 225 in the feeding roller 221.

A wheel 240 cooperates with the grooves 230 in the cam 228 and is rotatable upon a pin 241 mounted on a crank arm 242 secured to a shaft 243 rotatable in bearings in the auxiliary frame 125. An I-bolt 245 is also secured to the shaft 241 and extends downwardly through an opening in a boss 246 formed integrally with the side member 132 of the auxiliary frame. The boss 246 forms a base having a compression spring 247 encircling the I-bolt 245 and being compressed against the I-bolt by a nut 248 and associated locking nut 249. The shaft 243 is provided with a second crank arm 250 secured thereto at a point midway between the two side members 131 and 132, of the auxiliary frame. The other end of the crank arm 250 is secured to a shaft or pin 251 in a movable knife block 252 (see Figs. 5, 13, and 14) upon which a knife blade 253 is mounted by means of screws 254.

The knife blade 253 is tapered along its cutting edge as at 256 and is wider than the knife block to move in recesses 257 in the side members 131 and 132 respectively, over a stationary knife blade 258 secured by means of screws 259 to a stationary knife block and spacing member 260. The stationary knife block 260 is secured to the side members 131 and 132, respectively, of the auxiliary frame 125 by a bolt 261. A shoe member 262, having depending flanged edges 263 and a flaring forward edge 265 is secured to the side members 131 and 132 by the bolt 261 which penetrates slotted openings in the depending flanges 263, not shown, to provide for adjustment of this shoe member.

The shoe 262 cooperates with one of the shoes 111 secured to the bracket 110 and the folders are fed therebetween.

The watering wheel 235 cooperates with a water feeding wheel 266 rotatable upon a shaft 267 supported by the side members 131 and 132 of the auxiliary frame and is provided with an absorbent surface 268 of felt or other suitable material which contacts the watering wheel 235. One end of the shaft 267 fits in a recess in the side member 131 while the other end of the shaft penetrates an opening 269 in the side member 132 and is locked in position by a latch 270 pivotally held to the side member 132 by a screw 271. A watering pan 272 is supported along its outside by guide wires which may be flat metal straps 276. There is one such guide wire fitted into each of the grooves 239 in the watering wheel 235 and there is a similar spaced apart guide wire 281 fitted into the peripheral grooves 225 of the feeding wheel 221. These guiding wires are supported upon a frame composed of two metal straps 277 and 282 which are bent back upon themselves and to which the respective oppositely disposed guide wires or straps are secured by welding or otherwise.

A metal tube 278 and 284 is secured to each of the metal straps 277 and 282, respectively, and also to the oppositely disposed guide wires 276 and 281, respectively. This may be done by soldering or otherwise. Pins 279 and 285 penetrate the metal tubes 278 and 284, respectively, and also through openings in the side members 131 and 132, respectively, where they are locked in position by cotter pins 280 and 286. By this construction, the frame comprising the guide wires can be readily removed.

The side members 131 and 132, respectively, of the auxiliary frame 125 provide bearings near their upper ends for the shaft 287 supporting a reel 288 which carries a roll of sealing tape 289. This roll of sealing tape may be any gummed tape though our present invention is adapted to employ a roll of pre-cancelled stamps. The sealing tape 290 is drawn from the roll 289 and woven over a pulley 291 rotatable upon a shaft 292 secured in the auxiliary frame 125 and is then led between the oppositely disposed guide wires 291 and 276 between the feeding roller 221 and watering roller 235 to the knife blades 253 and 258.

It is to be noted that the shoe 111 has an inclined surface which cooperates with the inclined surface 293 of the movable knife block 252 so as to form the cut seal into a V-shape as the seal is cut from the tape. (See Fig. 5.)

Having described the detailed mechanical construction of an embodiment of our invention, we shall now explain its detailed operation. For this purpose, the operation from the time the sheet is fed into the folding machine until the time it is delivered as a sealed folder, will be described.

The paper sheets, such as 18, are fed by the feeding mechanism of the folder onto the rollers 17 where they are carried forward with their edges abutting the lower side of the folding machine (Fig. 1) by reason of the transverse mounting of the rollers 17. This feeding continues until the sheet is fed between the rollers 32 and 35. The edge of the sheet to be folded is then fed by these rollers into the folding panel 37 where it encounters the stop 42 which has been positioned previously according to the size of sheet to be folded in the folding panel 37 or the character of fold to be made in said sheet. As the edge of the sheet encounters the stop 42 the sheet 18 is bent and is fed between the feeding rollers 35 and 46. This causes the sheet to be folded once. It will be understood, of course, that depending upon the construction and manner in which the folding machine 15 is adjusted, any number of additional folds may be made in substantially the same manner as here illustrated by providing additional folding panels 37. These folds may be made lengthwise of the sheet or transversely thereof, after the sheet 18 has been folded into a folder such as 294 to fit between the feeding rollers 58 and 62 mounted in the main sealing device frame 20.

As explained, hereinbefore, the feeding roller 58 is driven while the feeding roller 62 is resiliently mounted thereabove and is rotated by the friction contact with the roller 58 and the folder 294 therebetween. The folder 294 is then moved over the guide plate 81 through feeding rollers 70 and 71, 75 and 78, 76 and 79, 77 and 80 and the intervening guide plates 83, 84, and 85 into the reversing panel 89. The idler gears such as 60 on stub shafts such as 61 interposed between gears such as 59 and 68, are for the purpose of bringing about the rotation of the feeding rollers in the proper direction. The folder then drops both by the action of gravity and by the continued rotation of the feeding roller 77 between the feeding roller 77 and the feeding roller 86.

The last named rollers now feed the folder 294 with its open edges forward between the surfaces formed by the shoes 111 and 262 (Figs. 4 and 5). It will be recalled that the roller 86 is resiliently mounted and will move from its center to a slight degree upon the passage of the folder between the feeding roller 77 and itself. Its movement off-center brings it into contact with the driving disc 137. (Fig. 6.) This brings about the rotation of the driving disc 137 at a speed in proportion to the speed of rotation of the feeding roller 86. This operation takes place because of the adjustment of the auxiliary frame 125 about the pivot 126 as a result of the movement of the adjusting screw 130 against the compression spring 129. This adjustment is made so that when there is no folder being fed between the rollers 77 and 86, the roller 86 is out of contact with the periphery of the driving disc 137 but as soon as the folder is fed between these rollers, driving contact is made between the roller 86 and the periphery of the driving disc 137.

The rotation of the driving disc 137 drives the bearing wheels 159 and 175 at a certain rate of speed dependent upon their position with respect to the radius of the disc which in turn is governed by the position of the adjusting screws 163 and 179. In other words, the position of the bearing wheel 159 with respect to the disc 137 is adjustable by turning the screw 163, which moves the bearing wheel on the surface. After proper adjustment is made, the adjusting screw 163 is prevented from turning by movement of the thumb locking nut 167. In a like manner the position of the bearing wheel 175 can be adjusted by turning the adjusting screw 179. The position of these two bearing wheels is adjusted in accordance with the size of the folder to be sealed. In other words, if the folder is of the largest type, the bearing wheel 159 will be relatively close to the center of the driving disc 137. The bearing wheel 175 is adjustable to a slight extent on the sleeve 150 and varied to compensate for wear in the cam member 228 which determines the length of the seal. It is possible to employ a longer seal by changing the distance between centers of the recesses 230 on the cam 228. If this is done, then an adjustment is made by means of the adjusting screw 179 to correspond therewith. The bearing wheel 159 rotates the shaft 146 and the shaft 187 through the miter gears 154 and 186. The rotation of the shaft 187 brings about the rotation of the cam 191. As the cam 191 is rotated its low part will contact the driving wheel 202 and spring 216 will adjust the position of the bell cranks 204 so as to bring the surface 209 of the driving wheel 208 into engagement with the hub 201 of the miter gear 200 (Figs. 7, 8, 9, and 10). Opposite movement of the bell crank occurs against the compression of the spring 216 when the high part of cam 191 contacts wheel 202.

The bearing wheel 175 is rotated from the disc 137 and brings about the rotation of the hub 201 through the miter gears 170 and 200. The rotation of the hub 201 is imparted to the driving wheel 208 and through it to the driving wheel 210 on the shaft 205. The shaft 205 is rotated to rotate the feeding roller 221 and the watering roller 235 through friction contact with the surfaces 224 and 238 and through the wheels 226 and 232.

The time at which the shaft 205 is rotated is governed entirely by the shape of the cam 191 and the amount of turning movement of the shaft 205 is also governed by the cam 191. The rotation of the feeding rollers 235 and 221 feeds the sealing tape 290 in a direction toward the knife blades 253 and 258. The rotation of the cam 228 rocks the shaft 243 through the crank arm 242 against the compression of the spring 237. The movement of the shaft 243 in one direction forces the movable knife block 252 in such direction as to permit the movement of the sealing tape or strip of pre-cancelled stamps 290 between the knives along the surface of the shoe 111. When the rotation of the shaft 205 ceases, the roller 240 will be opposite another recess 230 there being a difference of seven eighths (7/8) of an inch between centers and the spring 247 will rock the shaft 243 in the opposite direction, thus permitting the movable knife block 252 to move back to its original position causing a shearing action between the knife blades 253 and 258, cutting off a seal from the strip 290 at the proper point.

The inclined surface 293 of the movable knife block cooperates to bend the cut seal into a V-shape. The cut seal or pre-cancelled stamp now remains in position to receive a folder such as 294 as it is being fed into the rollers 77 and 86. The turning movement of the watering wheel 238 bears against the water feeding wheel 266 and causes a certain amount of water to be carried from the watering pan 272 against the raised portions, which might be likened to peripheral flanges on the cylindrical watering wheel 238. The watering wheel 238 is in contact with the gummed surface of the sealing tape and applies parallel paths of water thereto in its passage upward toward the knives. Since the guide wires 276 are only in contact with the dry portion of the gummed surface, being in the grooves 239, the danger of the tape sticking to the guide wires is greatly reduced.

Furthermore, the application of the water in this manner tends to make a very firm seal since any excess water as the seal is being applied to the folder will moisten the dry surface of the seal and the whole will be firmly attached to the edges of the folder.

The folder 294 is fed forward between the shoes 111 and 262, the flaring edges 113 and 265 of which serve to gather in the open edges of the folder, if there is any tendency to separate and hold them firmly together so that when the seal is applied, the open edges of the folder will be fastened tightly together. The movement of the folder 294 brings it against the V-shaped portions of the seal and pushes the seal between the second shoe 111 and the upper surface of the movable knife block 252. The pressure of the upper shoe 111 causes the seal 295 to adhere firmly to the edges of the folder. A continued movement of the folder brings it between the roller 115 and the conveying belt 102 on the roller 103. The sealed folder is then fed along the conveyor belt about the roller 101 and by the conveyor belt into a pile or hopper 296.

Attention is directed to the fact that the diameter of the feeding roller 101 is relatively large so that the turning radius of the folder 294 is quite long and there will be no distortion of its edges adjacent the seal 295, which has been applied.

It will be seen that as each folder is fed between the feeding rollers 77 and 86, the roller 86 is moved downwardly to contact the driving disc 137 and the driving disc 137 is operated to bring about the feeding and moistening of the sealing tape and the cutting of a section therefrom, of predetermined length, placing it in position so as to be ready to fasten the edges of the folder 294 as it is moved downwardly.

It is also to be noted that by reason of the configuration of the cam 228, the seal is cut off in predetermined lengths which, in the present instance is such as to form the seals from a roll of pre-cancelled stamps. It will be obvious, of course, that any gummed roll of tape may be employed instead of pre-cancelled stamps. The position of the bearing wheel 175 controls the length of the seal fed by wheel 271 and this can be adjusted very closely to compensate for any variation of the cutting mechanism so that the seals will be cut between pre-cancelled stamps, if such are used. Our improved sealing mechanism is, therefore, operated to seal the folders as rapidly as they are fed to the sealing mechanism. The movement of the folder itself actually controls this operation.

It will be obvious, of course, that the shoes 111 which hold the edges of the folder just prior and just after sealing can be made from spring material so as to exert sufficient pressure against the seal and edges of the folder, also to make a highly satisfactory sealing operation.

The adjustment of the adjusting screw 163 determines the time at which the sealing tape is fed into position and cut off. The shape of the cam 191 is also adjustable and this cam also will control the length of the seal. These various adjustments make it possible to secure a nice degree of precision in the forming of the seal and the placing of it in position for the successive folders.

It should also be noted that the sealing tape is fed upwardly and guided by means of the guide wires 276 and 281 and that these guide wires only contact the tape where it is dry, the tape being moistened in parallel strips on either side of each guide wire.

In the event that the machine should be stopped for some interval of time and the tape should stick to the guide wires, the guide wire frame can be readily removed by withdrawing the cotter pins and the supporting pins 279 and 285 as well as the shaft 233. Thus, the watering mechanism as well as the guide wires is rendered easily accessible.

The adjusting screw 184 which brings about movement of the bearing wheel 159 will be positioned at the proper point to bring a seal into position in timed relation to the size of the folders that are being folded. For small folders, the bearing wheel 159 will have a greater radius with respect to the driving disc 137 than with large folders.

The spacing between folders is automatically taken care of since the folders themselves, as they come into position, initiate the operation of the sealing and tape feeding mechanism. The auxiliary frame 125 is readily removable by withdrawing the pins or shafts 126 and 127, and is adjustable by the adjusting screw 130 to compensate for various thicknesses of folders. At the same time, the main sealing frame 20 is laterally and vertically adjustable in a manner that has already been described.

The main sealing frame 20 may be removed from its position on the angles 28 and placed in the other side of the folding machine on the angles 297 if transverse folds are being made in the folder. At the same time, the peculiar construction of the main frame and its mounting upon the angles 28 of the folding machine frame, permits it to be employed with various types of folding machines and fitted thereto, irrespective of their width, since the shaft 24 associated with the tubes 22 and 23 can be withdrawn from the tubes to compensate for various widths.

The removability of the auxiliary sealing device frame 125 itself, carrying the main sealing mechanism permits another frame to be substituted in case anything goes wrong with the mechanism, with a minimum of effort.

The spacing between the various feeding rollers of the sealing device is such as to accommodate the smallest type of folder so that all sizes may be sealed.

Attention is also directed to the fact that if the folders are reversed in the reversing panel 89 that they will feed through the sealing mechanism on a direct line until after the seal has been attached. This prevents any tendency to buckle or distort the edges and permits the seal to be fastened in a much more satisfactory manner.

While we have described a certain specific embodiment of our invention, we are aware that many modifications, changes and departures may be made therefrom, without departing from the spirit and scope thereof, as set forth in the appended claims.

We claim:

1. In apparatus of the character described, means for bending a postage stamp and positioning it for application before a folder reaches the bent stamp, means for applying the bent stamp on the folder over an edge thereof, means for supplying the stamp to the bending means, and means for feeding said folder into the bent stamp through said first named means with said edge of the folder leading.

2. In apparatus of the character described, means for feeding a strip of postage stamps, means served thereby for bending the stamps one after another to position them for application before folders reach the bent stamps, means for applying the bent stamps one after another on successive folders over corresponding edges thereof, means for separating each stamp from the strip when it is about to be bent, and means for feeding said folders one after another into successive bent stamps through said bending and applying means with said edges of the folders leading.

3. In apparatus of the character described, means for rotatably supporting a roll of postage stamps, means for feeding a strip of stamps from said roll, means served by the strip feeding means for bending the stamps one after another to position them for application before folders reach the bent stamp, means for applying the bent stamps one after another on successive folders over corresponding edges thereof, means for cutting each stamp from the strip when it is about to be bent, and means for feeding said folders successively into successive bent stamps through said bending and applying means with said edges of the folders leading.

4. In apparatus of the character described, means for feeding a strip of postage stamps, means served thereby for bending the stamps one after another and applying them in like manner on successive folders over corresponding edges thereof, means for separating each stamp from the strip when it is about to be bent, means for feeding said folders one after another into successive bent stamps through said bending and applying means with said edges of the folders leading, operating mechanism for the strip feeding and stamp separating means connected with and actuated by the folder feeding means when a folder is present therein and inactive and disconnected from said folder feeding means when no folder is fed thereby, and means for connecting said operating mechanism with and disconnecting it from the folder feeding means and forming a part of the latter.

5. In apparatus of the character described, means for rotatably supporting a roll of postage stamps having transverse lines of perforations therebetween, means for feeding a strip of stamps from said roll, means served by the strip feeding means for bending stamps one after another and applying them in like manner on successive folders over corresponding edges thereof, means for cutting each stamp from the strip on one of said lines of perforation when the stamp is about to be bent, means for feeding said folders successively into successive bent stamps through said bending and applying means with said edges of the folders leading, operating mechanism for the strip feeding and stamp cutting means connected with and actuated by the folder feeding means when a folder is present therein and inactive and disconnected from said folder feeding means when no folder is fed thereby, and means for connecting said operating mechanism with and disconnecting it from the folder feeding means and forming a part of the latter.

6. In apparatus of the character described, means for bending postage stamps successively to position them one after another for application before folders reach the bent stamps, means for applying the bent stamps one after another on successive folders over corresponding edges thereof, means for moistening gummed sides of the stamps and delivering them one after another to the bending means, and means for feeding said folders one after another into successive bent stamps through said bending and applying means with said edges of the folders leading.

7. In apparatus of the character described, means for bending postage stamps successively and applying them in like manner on successive folders over corresponding edges thereof, means for moistening gummed sides of the stamps and delivering them one after another to the bending and applying means, means for feeding said folders successively into successive moistened bent stamps through said bending and applying means with said edges of the folders leading, operating mechanism for the stamp moistening and feeding means connected with and actuated by the folder feeding means when a folder is present therein and inactive and disconnected from said folder feeding means when no folder is fed thereby, and means for connecting said operating mechanism with and disconnecting it from the folder feeding means and forming a part of the latter.

8. In apparatus of the character described, means for bending and supporting a postage stamp with moistened adhesive portions thereof faced toward each other in angular relation, means for applying the stamp on a folder over an edge thereof and affixing the opposed moistened adhesive portions of said stamp simultaneously on opposite sides of said folder, and means for feeding the folder through the bending and supporting means, between said portions of the stamp, and through said applying and affixing means, with said edge of the folder leading.

9. In a machine for sealing folders, feeding mechanism for feeding the folders, sealing mechanism for sealing the open edges of each folder, and means for adjusting said sealing mechanism to compensate for varying sizes of folders.

10. In a sealing machine, means for cutting straps from a roll of gummed tape, mechanism for conveying folders of various sizes through the sealing machine, means controlled by the conveying operation for operating said cutting means, and means for varying the time of operation of said cutting means to compensate for varying sizes of folders.

11. In a sealing machine, means for cutting straps from a roll of gummed tape, mechanism for conveying folders of various sizes through the sealing machine, means controlled by the conveying operation for operating said cutting means, and means for varying the time of operation of said cutting means in accordance with various sizes of folders and while said conveying means is operative.

12. In a machine for sealing folders, mechanism for feeding the folders, sealing mechanism for applying a seal to the open edge of each folder, means for driving the feeding mechanism, driving means for said sealing mechanism, a folder controlled connection between said driving means, and means for adjusting said connection.

13. In apparatus of the character described, seal feeding and cutting mechanism, means for receiving seals therefrom and applying them on folders over corresponding edges thereof, driven means for feeding the folders through the seal receiving and applying means with said edges of the folders leading, means for driving the seal feeding and cutting mechanism, and a driven element forming part of the folder feeding means, said element being displaceable in one direction to engage and actuate said driving means when a folder is present in the folder feeding means and being movable in the opposite direction out of engagement with said driving means when there is no folder present in the folder feeding means.

14. In apparatus of the character described, seal feeding and cutting mechanism, means for receiving seals therefrom and applying them on folders over corresponding edges thereof, means for driving the seal feeding and cutting mechanism, and a pair of rollers for feeding folders through the seal receiving and applying means with said edges of the folders leading, one of the rollers being displaceable in one direction to engage and actuate the driving means when a folder is present between the rollers, said roller being movable in the opposite direction out of engagement with said driving means when there is no folder present between said rollers.

15. In a sealing machine, mechanism for forming and applying seals to the open edges of folders and including means for bending each seal into substantially V-shaped formation before it is applied to a folder, and means for feeding folders into said seals and through said mechanism in a single plane.

16. In a machine for sealing folders, mechanism for feeding the folders, sealing means for applying a seal to the open edges of each folder, and spring means for pressing the edges of each folder together as the seal is about to be applied.

17. In a machine for sealing folders, mechanism for feeding the folders, sealing means for making and applying a seal to the open edges of each folder, spring means for pressing the edges of each folder together as the seal is about to be applied and additional spring means for bending the seal while it is being made and pressing the seal against the folder while it is being applied.

18. In apparatus of the character described, mechanism for conveying folders of various sizes therethrough, a support for a roll of gummed tape, means controlled by the folders for feeding and cutting the tape into straps, means for applying the straps on the folders, and means for varying the speed of operation of said feeding and cutting means to adapt the same for operation in connection with the particular size of folder being conveyed by said mechanism.

19. In apparatus of the character described, means for feeding a strip gummed on one side thereof, means served thereby for bending a gummed seal so that gummed portions thereof are faced toward each other in angular relation, means for cutting the seal off the leading end of said strip when the seal is about to be bent as aforesaid, means for applying the seal on a folded product over an edge thereof and affixing the opposed gummed portions of the seal on opposite sides of said product, means for feeding the product through the bending and supporting means, between said opposed gummed portions of the seal, and through said applying and affixing means, with said edge of the product leading, operating mechanism for the strip feeding and seal cutting means connected with and actuated by the folder feeding means when a folder is present therein and inactive and disconnected from said folder feeding means when no folder is fed thereby, and means for connecting said operating mechanism with and disconnecting it from the folder feeding means and forming a part of the latter.

20. In apparatus of the character described, driven rollers for feeding a strip and moistening a gummed side thereof, means served by said rollers for bending a gummed seal so that gummed portions thereof are faced toward each other in angular relation, a reciprocating knife for cutting the seal off the leading end of said strip when the seal is about to be bent as aforesaid, means for feeding the product through the bending and supporting means, between said opposed gummed moistened portions of the seal, and through said applying and affixing means, with said edge of the product leading, operating mechanism for said strip feeding and seal cutting means connected with and actuated by the folder feeding means when a folder is present therein and inactive and disconnected from said folder feeding means when no folder is fed thereby, and means for connecting said operating mechanism with and disconnecting it from the folder feeding means and forming a part of the latter.

21. In apparatus of the character described, means for feeding a gummed strip and cutting seals therefrom, means for bending the seals and applying them on folders over corresponding edges thereof, means for feeding folders into the bent seals through said bending and applying means with said edges of the folders leading, and means for varying the speed of operation of said strip feeding and seal cutting means to adapt the same for operation in connection with folders of different sizes.

22. In apparatus of the character described, a main frame, a supplemental frame pivoted on said main frame and carrying strip feeding and cutting means and driving means therefor including a rotatable element, seal bending and applying means on said frames and served with seals by the strip feeding and cutting mechanism, means on the main frame for feeding folders to the seal bending and applying means whereby seals are applied on said folders, means for intermittently operating said driving means from the folder feeding means including a driven element of the latter movable into and out of engagement with said rotatable element through presence or absence respectively of a folder in the folder feeding means, and means for adjusting the supplemental frame, said rotatable element, and a part of the seal applying means to accommodate folders of different thicknesses.

23. In feeding and sealing apparatus for use on folding machines, a frame adapted to be mounted on the folding machine opposite mechanism thereof from which a folder is delivered, means on the frame for bending a seal and applying it on the folder over an edge thereof, means for supplying the seal to the bending and applying means, means on the frame for receiving the folder and feeding said folder into the bent seal and through the bending and applying means with said edge of the folder leading, mechanism on the frame for driving the seal supplying means and including a rotatable element, and means on said frame for driving said last named mechanism intermittently including a driven element of the folder feeding means movable into and out of engagement with said rotatable element through the presence and absence respectively of a folder in said folder feeding means.

24. In apparatus of the character described, means for applying seals on folders, means for feeding folders of various sizes through the seal applying means, mechanism controlled by the folders for feeding and cutting tape or the like into seals and delivering them to the seal applying means, and means for varying the speed of operation of said tape feeding and cutting mechanism in accordance with variations in time required for the feeding of various sizes of folders through said applying means by said folder feeding means.

RAY OHLSEN.
ANTON J. KNUTKOWSKI.

CERTIFICATE OF CORRECTION.

Patent No. 2,050,456.  August 11, 1936.

RAY OHLSEN, ET AL.

It is hereby certified that error appears in the printed specification of the above numbered patent requiring correction as follows: Page 1, first column, line 32, for the word "form" read from; page 9, first column, line 12, claim 23, after the word "means" insert on the frame; and that the said Letters Patent should be read with these corrections therein that the same may conform to the record of the case in the Patent Office.

Signed and sealed this 23rd day of March, A. D. 1937.

(Seal)
Henry Van Arsdale
Acting Commissioner of Patents.